United States Patent [19]
Schlapp et al.

[11] Patent Number: 5,579,473
[45] Date of Patent: Nov. 26, 1996

[54] INTERFACE CONTROLLER FOR FRAME BUFFER RANDOM ACCESS MEMORY DEVICES

[75] Inventors: Stephen A. Schlapp, San Jose; Michael F. Deering, Los Altos; Ewa M. Kubalska, San Jose; Michael G. Lavelle, Saratoga, all of Calif.

[73] Assignee: Sun Microsystems, Inc., Mountain View, Calif.

[21] Appl. No.: 276,814

[22] Filed: Jul. 18, 1994

[51] Int. Cl.[6] ............................................. G06F 15/00
[52] U.S. Cl. ..................... 395/501; 395/446; 395/449; 395/509; 395/515
[58] Field of Search ........................... 395/162–166, 395/403, 445, 446–449; 345/185, 201

[56] References Cited

U.S. PATENT DOCUMENTS

| | | | |
|---|---|---|---|
| 5,185,856 | 2/1993 | Alcorn et al. | 395/164 |
| 5,450,542 | 9/1995 | Lehman et al. | 395/164 |
| 5,450,563 | 9/1995 | Gregor | 395/445 |

*Primary Examiner*—Kee Wei Tung
*Attorney, Agent, or Firm*—Blakely Sokoloff Taylor & Zafman

[57] ABSTRACT

A frame buffer memory device controller that schedules and dispatches operations to frame buffer memory devices is disclosed. The frame buffer memory device controller schedules and dispatches cache control operations to reduce timing overheads caused by cache prefetch operations, and operations to write back dirty cache lines and clear cache lines in the frame buffer memory devices. The frame buffer memory device controller also schedules and dispatches control operations to reduce timing overheads caused by video refresh operations from the frame buffer memory devices video output ports.

23 Claims, 9 Drawing Sheets

L2$ Tags

| | A | Page |
|---|---|---|
| Bank0 | | |
| Bank1 | | |
| Bank2 | | |
| Bank3 | | |

*Figure 8*

L1$ Tags

| | V | W | S | Bank | Page | Column |
|---|---|---|---|---|---|---|
| Block0 | | | | | | |
| Block1 | | | | | | |
| Block2 | | | | | | |
| Block3 | | | | | | |
| Block4 | | | | | | |
| Block5 | | | | | | |

*Figure 9*

INTERFACE CONTROLLER FOR FRAME BUFFER RANDOM ACCESS MEMORY DEVICES

BACKGROUND OF THE INVENTION

1. Field of the Invention

The present invention pertains to the field of computer graphic systems. More particularly, this invention relates to an interface controller for frame buffer memory devices that provide a write mostly architecture for accelerated graphics rendering operations.

2. Background

Prior computer graphics systems typically employ a frame buffer comprised of video random access memory (VRAM) chips. The VRAM chips store a set of pixel data that defines an image for display on display device. Typically, a rendering controller in such a system renders the image and writes the pixel data into the VRAM chips. In such a system, a random access memory digital to analog conversion device (RAMDAC) typically accesses the pixel data from the VRAM chips and performs color lookup table and digital to analog conversion functions on the pixel data.

Prior VRAM chips typically contain a dynamic random access memory (DRAM) array along with a random access port and a serial access port. Typically, the RAMDAC accesses the DRAM array of a VRAM chip through the serial access port, and the rendering controller accesses the DRAM array through the random access port according to DRAM page mode access. Unfortunately, the DRAM page mode mechanism of such prior VRAM chips delivers severely reduced pixel access speeds if the rendering controller traverses more than two or three rows of the raster scan while drawing a line. Moreover, read-modify-write operations commonly employed during rendering operations are significantly slower than write operations to such prior VRAM chips.

A computer graphic system may employ a frame buffer comprised of frame buffer random access memory (FBRAM) chips. Such FBRAM chips include a DRAM core area that store a set of pixel data that defines an image for display on a display device. Typically, a rendering controller in such a graphic system renders the image and writes the corresponding pixel data into the FBRAM chips.

Such FBRAM chips provide increased throughput to the DRAM cores by providing two levels of two-dimensional area caches. For example, such FBRAM chips provide a level one (L1) pixel cache that reflects preselected areas of the DRAM core. Such FBRAM chips also provide a level two (L2) cache closely coupled to the DRAM core of the FBRAM chip. Such FBRAM chips provide improved rendering throughput by converting the typical read-modify-write frame buffer access cycle into a write mostly transaction at the input pins of the FBRAM devices.

However, the rendering throughput to such a frame buffer having FBRAM chips is reduced for pixel accesses that result in cache misses to either the L1 or the L2 caches or both. A pixel access in such a system targeted for an area of the DRAM core that is not resident in the L1 or the L2 caches requires that the pixel operation be stalled while the missing cache block is fetched from the DRAM core. Such operations in the FBRAM chips for fetching missed cache blocks stalls the rendering pipeline inputs into the FBRAM chips and slows overall rendering speed.

SUMMARY OF THE INVENTION

A frame buffer memory device controller is disclosed that schedules and dispatches operations to frame buffer memory devices to ensure that pixel data required by pixel access operations will be resident in the level one cache of the frame buffer memory devices when the pixel access operations are dispatched. The frame buffer memory device controller creates, schedules and dispatches cache control operations to reduce timing overheads caused by operations to write back dirty cache lines and to clear cache lines in the frame buffer memory devices. The frame buffer memory device controller also creates, schedules and dispatches control operations to reduce timing overheads caused by video refresh operations from the frame buffer memory device's video output ports.

The frame buffer memory device controller is coupled to receive pixel access transactions targeted for pixel data stored in the frame buffer memory devices. For one embodiment, the frame buffer memory device controller includes an allocator circuit, a scheduler circuit, and an arbiter circuit. The allocator circuit determines cache states of the frame buffer memory devices based on previous pixel access transactions and determines required cache control operations. The scheduler circuit buffers pixel access operations and cache control operations and pushes the appropriate cache control operations ahead of the corresponding pixel access transactions. The arbiter circuit arbitrates the cache control operations with video request operations to dispatch the cache control operations according to the current state of the frame buffer memory devices. The arbiter circuit dispatches pixel access transactions according to the current state of the frame buffer memory devices.

BRIEF DESCRIPTION OF THE DRAWINGS

FIG. 8 illustrates the L2 cache tags in the arbiter circuit which includes a bit indicating the state of the corresponding DRAM bank that indicates whether the DRAM bank is accessed or precharged.

FIG. 9 illustrates the format of the L1 cache tags in the arbiter circuit for one embodiment.

DETAILED DESCRIPTION

Figure 1:
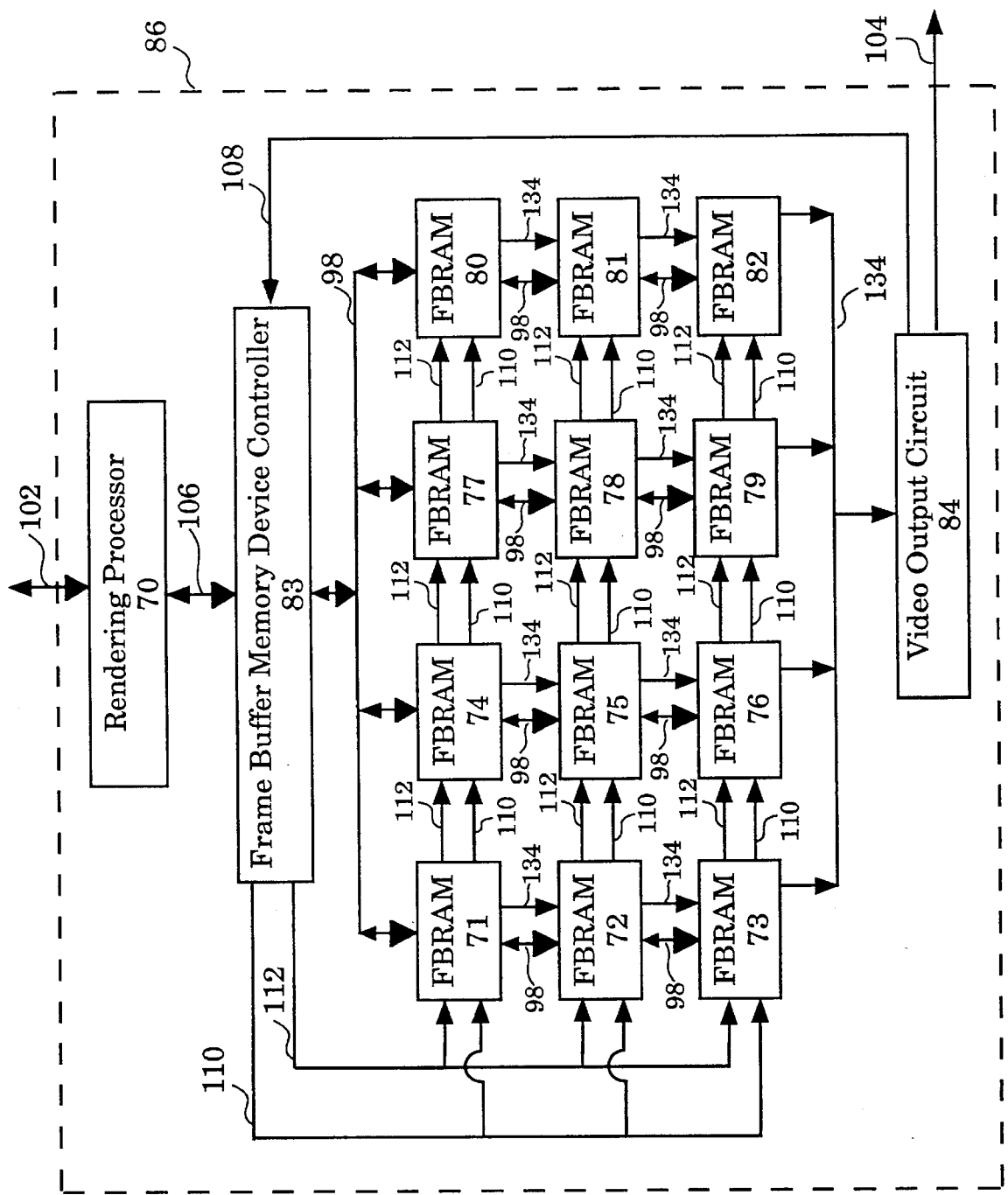
FIG. 1 illustrates a graphic subsystem comprising a set of FBRAM chips, a rendering processor, a frame buffer memory device controller, and a video output circuit.

FIG. 1 illustrates a graphic subsystem 86. The graphic subsystem 86 comprises a set of FBRAM chips 71–82, a rendering processor 70, a frame buffer memory device controller 83, and a video output circuit 84.

Each FBRAM chip 71–82 contains internal ALU and pipelining circuitry for providing a "write-mostly" interface from the rendering processor 70 to the FBRAMs. The write mostly architecture of the FBRAM chips 71–82 minimizes the average memory cycle time during rendering operations by the rendering processor 70.

For one embodiment, each FBRAM chip 71–82 contains a 10 megabit DRAM array that supports a 320×1024×32 bit deep frame buffer. The DRAM array in each FBRAM chip 71–82 comprises four independent interleaved DRAM banks.

Each FBRAM chip 71–82 also contains a pixel ALU, and a static random access memory (SRAM) pixel buffer. The SRAM pixel buffer in each FBRAM chip 71–82 functions as a pixel cache for accesses by the rendering processor 70.

Each FBRAM chip 71–82 contains a global bus that enables high bandwidth communication between the four DRAM banks and the SRAM pixel buffer. Each FBRAM chip 71–82 also contains a pair of video buffers that perform CRT refresh operations for a display device.

The pixel ALU in each FBRAM chip 71–82 includes a set of four raster operations units. Each raster operation unit performs selectable raster operations on each individual byte of pixel data transferred to the corresponding SRAM pixel buffer. The pixel ALU in each FBRAM chip 71–82 contains a set of four pixel blending units. Each pixel blending unit combines one byte of old internal pixel values with one byte of new pixel values and related information received from the rendering processor 70 according to a series of pipeline processing stages for the pixel ALU.

Each FBRAM chip 71–82 includes circuitry that enables concurrent operations involving the DRAM array, the SRAM pixel buffer, the pixel ALU, and an internal set of video buffers. Each FBRAM chip 71–82 includes circuitry that enables pixel data transfer between the DRAM array and the SRAM pixel buffer while the rendering processor 70 accesses the SRAM pixel buffer through the pixel ALU and while the video output circuit 84 reads video data from the video buffers.

The FBRAM chips 71–82 transfer video data to the video output circuit 84 over a video bus 134. The video output circuit 84 generates a set of corresponding video clocks on the video buses 134 that synchronize the transfer of video data from the FBRAM chips 71–82.

The rendering processor 70 writes pixel data to the FBRAM chips 71–82 through the frame buffer memory device controller 83 over the rendering bus 98. The frame buffer memory device controller 83 transfers frame buffer control signals and commands to the FBRAM chips 71–82 to control internal operations of the FBRAM chips 71–82, including the pixel ALU operations, the SRAM pixel buffer and DRAM array operations, and video buffer operations.

The rendering processor 70 receives graphics primitives from a host processor (not shown) over a system bus 102. The rendering processor 70 renders the received graphics primitives and transfers a corresponding series of pixel access transactions to the frame buffer memory device controller 83 over a frame buffer control bus 106.

The frame buffer memory device controller 83 receives the pixel access transactions from the rendering processor 70 and issues a corresponding series of pixel access transactions to the FBRAM devices 71–82. The frame buffer memory device controller 83 transfers pixel data for the pixel access transactions to and from the FBRAM chips 71–82 over a rendering bus 98. The frame buffer memory device controller 83 issues commands that control the DRAM core operations of the FBRAM chips 71–82 over a DRAM operation bus 110. The frame buffer memory device controller 83 issues commands that control pixel cache and pixel ALU functions to the FBRAM chips 71–82 over a pixel operation bus 112.

The frame buffer memory device controller 83 issues commands over the DRAM operation bus 110 to control operations between the L2 pixel cache and the L1 pixel cache, the video buffers or the DRAM core in each of the FBRAM chips 71–82. The frame buffer memory device controller 83 issues commands over the pixel operation bus 112 to control operations between the pixel ALU and L1 pixel cache in each of the FBRAM chips 71–82. The frame buffer memory device controller 83 issues the commands over the DRAM operation bus 110 and the pixel operation bus 112 according to pixel addresses and data and operation commands received over the frame buffer control bus 106, according to video operations specified by the video output circuit 84 via a video operation bus 108, and according to the current cache state of the FBRAMs, maintained by the frame buffer memory device controller.

Figure 2:
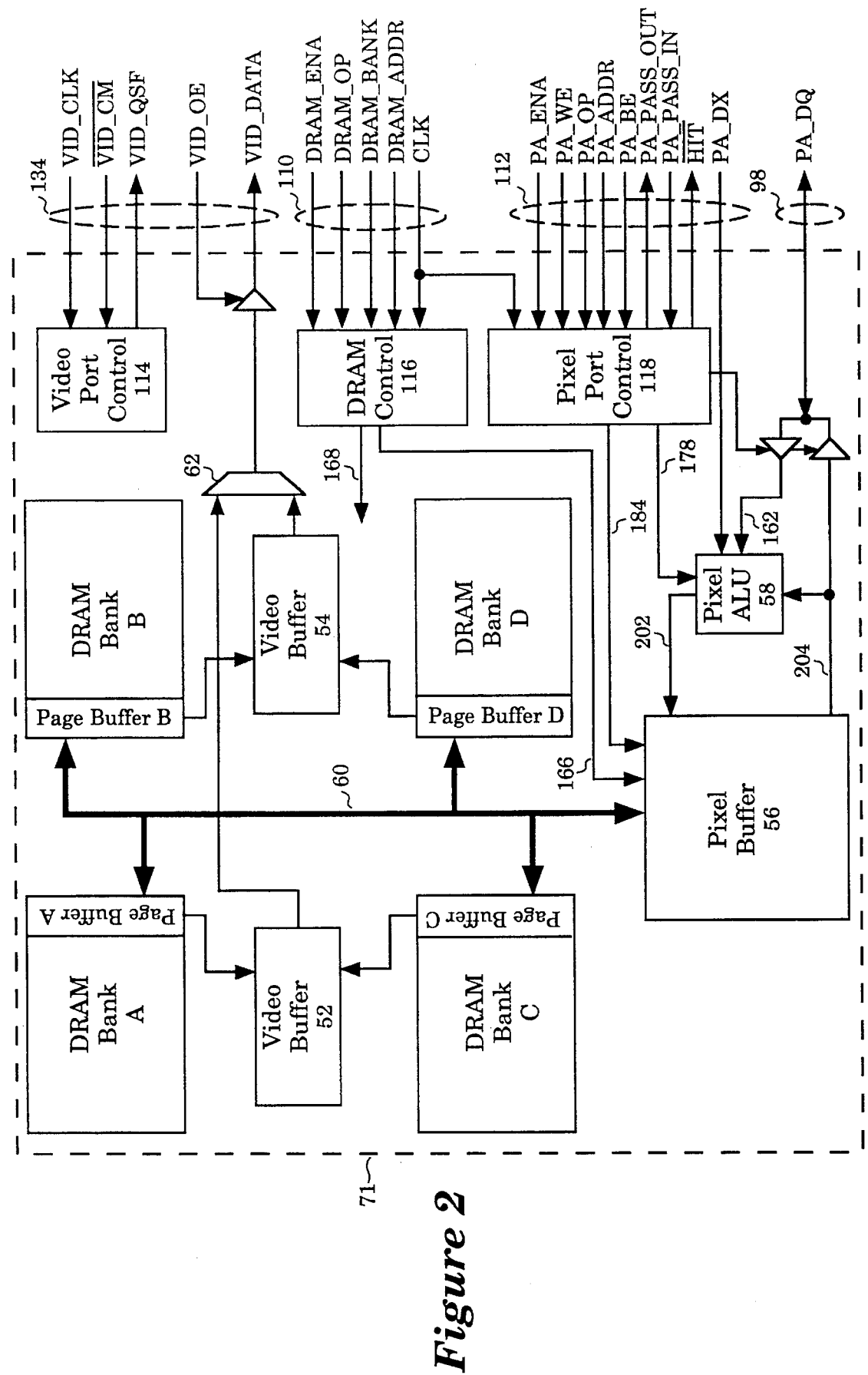
FIG. 2 illustrates an FBRAM chip for one embodiment which comprises a DRAM array, a pair of video buffers, a pixel buffer, and a pixel ALU.

FIG. 2 illustrates the FBRAM chip 71 for one embodiment. The FBRAM chip 71 comprises a DRAM array, a pair of video buffers 52 and 54, a pixel buffer 56, and a pixel ALU 58. The FBRAM chip 71 is substantially similar to each of the FBRAM chips 72–82.

The DRAM array in the FBRAM chip 71 comprises a set of four DRAM banks (DRAM banks A–D) and corresponding page buffers A–D. For one embodiment, each DRAM bank A–D comprises a 2.5 megabit DRAM array arranged in 257 pages. Each page comprises 320 words and each word comprises 32 bits.

The page buffers A–D comprise the sense amplifiers of the corresponding DRAM banks A–D. For one embodiment, each page buffer A–D buffers a 320 word page of the corresponding DRAM bank A–D.

The video buffers 52 and 54 buffer video data for transfer to the video output circuit 84 over the video bus 134. The video buffer 52 receives data from the page buffers A and C. The video buffer 54 receives data from the page buffers B and D. The data in the video buffers 52 and 54 is shifted out over the video bus 134 to the video output circuit 84 through a multiplexer 62.

The pixel buffer 56 is a high speed, 3 port static RAM (SRAM) and functions as a level one (L1) pixel cache for the FBRAM chip 71. The associativity parameters for the L1 pixel cache are determined externally by the frame buffer memory device controller 83 and includes fully associative mapping. The L1 pixel cache employs a write back policy. The L1 pixel cache comprises a set of L1 cache blocks. The rendering processor 70 performs data writes to each L1 cache block through the frame buffer memory device controller 83. The multiple writes are accumulated in each L1 cache block for subsequent transfer to the DRAM banks A–D through a level two (L2) pixel cache.

The pixel buffer 56 provides an ALU read port 204 and an ALU write port 202. The pixel input data 162 from the input/output pins of the FBRAM chip 71 provides source data for the pixel ALU 58. The pixel ALU 58 performs a selected pixel processing function and transfers write port data 202 into the ALU write port of the pixel buffer 56.

If the desired pixel processing function requires a read-modify-write operation, the pixel ALU 58 obtains the read data from the read port 204, performs the modification by merging the source data 162 with the read data 204, and then writes the result to the pixel buffer write port 202. The pixel buffer 56 read and write ports enable simultaneous one clock read and write operations that provide one-clock pipelined writes on the rendering bus 98 to accomplish one-clock pipelined read-modify-write cycles.

The rendering processor 70 reads data from the read port of the pixel buffer 56 over the rendering bus 98 through the frame buffer memory device controller 83. The read port data 204 from the pixel buffer 56 is accessible on the rendering bus 98 through the input/output pins of the FBRAM chip 71.

The pixel buffer 56 provides a global read/write port for block transfer operations over the global bus 60. The rendering processor 70 can issue operations to the frame buffer memory device controller 83 to cause the ALU read port, the ALU write port, and the global read/write port of the pixel buffer 56 to be active simultaneously.

For one embodiment, the pixel buffer 56 contains a 2048 bit SRAM buffer and a corresponding dirty tags memory. The 2048 bit SRAM buffer is organized into eight 256 bit L1 cache blocks. Each L1 cache block buffers eight words each comprising 32 bits. Each L1 cache block buffers pixel data for a 2 wide by 4 high rectangle of 32-bit pixels. The eight L1 cache blocks also correspond to eight sets of 32 bit dirty tag bits in the dirty tags memory. The global read/write port is 256 bits wide, and the ALU read and write ports are each 32 bits wide.

The pixel ALU 58 enables pipelined read-modify-write operations into the pixel buffer 56 over the rendering bus 98. The pipelined read-modify-write operations include Z-buffer compare, RGB alpha blending, and Boolean operations. The global read/write port of the pixel buffer 56 enables parallel transfer of an entire L1 cache block between the page buffers A–D and the pixel buffer 56 over a global bus 60.

The page buffers A–D comprise the L2 pixel cache. The L2 pixel cache is directly mapped to the DRAM banks A–D. Each page buffer A–D maps to one of the pages of the corresponding DRAM bank A–D. For one embodiment, an L2 pixel cache entry comprises 320 words of 32 bits for each word. Each L2 cache entry is arranged as a 20 wide by 16 high rectangle of pixels. The L2 pixel cache employs a write through policy. Pixel data written into a L2 pixel cache entry over the global bus 60 is transferred immediately into the corresponding page of the corresponding DRAM bank A–D.

The global bus 60 enables communication between the L1 pixel cache and the L2 pixel cache. For one embodiment, the global bus 60 is 256 bits wide and enables the parallel transfer of a 2×4 pixel block between the L1 pixel cache and L2 pixel cache.

Each DRAM bank A–D contains a sense amplifier bus comprising a set of bit lines. The sense amplifier buses couple the page buffers A–D to the DRAM banks A–D. For one embodiment, each sense amplifier bus enables the parallel transfer of a 20×16 (with 32 bit pixels) pixel rectangle from the DRAM banks A–D to the corresponding L2 pixel caches.

The frame buffer memory device controller 83 interleaves accesses to the DRAM banks A–D via the control and address signals of the DRAM and pixel operation busses 110 and 112. The frame buffer memory device controller 83 overlaps precharge operations on the sense amplifies of one of the page buffer A–D with rendering operations into another of the DRAM banks A–D. The frame buffer memory device controller 83 also interleaves access page operations to one of the DRAM banks A–D with rendering operations into another of the DRAM banks A–D.

The FBRAM chip 71 provides one set of pixel port control and address input/output interface pins on the pixel operation bus 112 for accessing the pixel buffer 56 via the ALU 58 and the read and write ports 204 and 202 and an independent set of DRAM port control and address input/output interface pins on the DRAM operation bus 110 for accessing the DRAM banks A–D via the global bus 60 or the video buffers 52 and 54. The independent sets of control and address pins enable operations for the DRAM banks A–D to proceed in parallel with ALU operations to the pixel buffer 56. The FBRAM chip 71 also provides another independent set of video port control interface pins on the video operation bus 134 for video operations involving the video buffers 52 and 54 and the serial outputs 134.

The input/output interface for the FBRAM chip 71 comprises a pixel port control interface 118 for the pixel port operations, a video port control interface 114 for the video operations, and a DRAM control interface 116 for the DRAM operations in the FBRAM chip 71. The pixel port access operations for the pixel ALU 58 and the pixel buffer 56 are controlled by a set of pixel port address and control signals. The operations for the DRAM banks A–D are controlled by a set of DRAM control signals. The functions of the video buffers 52 and 54 are controlled by a set of video control signals. The three sets of separate controls, along with the four way interleaved DRAM banks, enable up to six simultaneous operations for the FBRAM chip 71.

Table 1 lists the pixel port address and control signals for one embodiment. The frame buffer memory device controller 83 controls pixel port operations to the pixel ALU 58 and the pixel buffer read and write ports 204 and 202 via the pixel port address and control signals on the pixel operation bus 112. The frame buffer memory device controller 83 asserts the PA_ENA[1..0] signals to initiate an operation for the pixel ALU 58 and pixel buffer ports 204 and 202. If either PA_ENA signal is unasserted, then the remaining pixel port control signals are ignored.

TABLE 1

| Signal Name | Pin Count | I/O | Description |
| --- | --- | --- | --- |
| PA_ENA | 2 | I | Enable Pixel ALU op |
| PA_WE | 1 | I | Pixel ALU Read/Write pin |
| PA_OP | 3 | I | Pixel ALU Opcode |
| PA_ADDR | 6 | I | Read/Write Address |
| PA_BE | 4 | I | Byte Write Output Enables |
| PA_DQ | 32 | I/O | Data pins |
| PA_DX | 4 | I | Data Extension pins for blend |
| PA_PASS_OUT | 1 | O | Compare output |
| PA_PASS_IN | 1 | I | Compare input |
| HIT | 1 | O | Picking logic flag |

The frame buffer memory device controller 83 asserts the PA_WE signal to indicate a write operation. The PA_WE signal indicates a read operation if unasserted. The frame buffer memory device controller 83 drives the PA_OP[2..0] signals in combination with the PA_WE signal to specify an operation for the pixel ALU 58. The frame buffer memory device controller 83 employs the PA_ADDR[5..0] signals to specify the pixel buffer read and write port 204 and 202 addresses for the pixel ALU 58 operation.

The frame buffer memory device controller 83 drives the PA_BE[3..0] signals during read and write operations including register writes and dirty tag writes. During a read operation, the PA_WE is unasserted and the PA_BE signals provide output byte enable signals. During a write operation, the PA_WE is asserted and the PA_BE signals provide write byte enable signals. The PA_BE[0] signal controls the PA_DQ[7..0] data byte, the PA_BE[1] signal controls the PA_DQ[15..8] data byte, the PA_BE[2] signal controls the PA_DQ[23..16] data byte, and the PA_BE[3] signal controls the PA_DQ [31..24] data byte.

The frame buffer memory device controller 83 employs the PA_DQ[31..0] signals during read and write operations for the FBRAM chip 71 via the rendering bus 98. During write operations, the PA_DQ signals are transferred to the pixel ALU 58. During read operations, the PA_DQ signals are provided by the read port of the pixel buffer 56. During internal copy and vertical scroll operations, the frame buffer memory device controller 83 supplies a write address with the PA_DQ[29..24] signals.

During ALU writes which perform blending, the frame buffer memory device controller 83 uses the PA_DX[3..0] signals to provide extra high order data bits for the data bytes transferred via the PA_DQ signals. The PA_DX[0] signal provides a high order bit for the PA_DQ[7..0] byte. Similarly, the PA_DX[1] signal is a high order bit for the PA_DQ[15..8] byte, the PA_DX[2] signal is a high order bit for the PA_DQ[23..16], and the PA_DX[3] signal is a high order bit for the PA_DQ[31..24] byte.

The PA_PASS_IN and the PA_PASS_OUT signals enable coordination of the pass/fail compare unit results among the FBRAM chips 71–82. The compare result from the internal compare unit of the FBRAM chip 71 is transferred via the PA_PASS_OUT signal. The PA_PASS_OUT signal indicates whether an internal compare test failed during stateful write operations to the pixel buffer 56. Data is written into the pixel buffer 56 during a stateful data write operation if the PA_PASS_IN signal indicates pass and the PA_PASS_OUT signal indicates pass.

Table 2 describes the DRAM address and control signals for one embodiment. The frame buffer memory device controller 83 initiates DRAM access operations for the DRAM banks A–D, the global bus 60, the pixel buffer global bus port, and the video buffers 52 and 54 via the DRAM address and control signals on the DRAM operation bus 110. The frame buffer memory device controller 83 specifies a DRAM operation via the DRAM_OP[2.0] signals. The frame buffer memory device controller 83 asserts the DRAM_ENA on a rising edge of the master clock CLK to initiate an operation to one of the DRAM banks A–D during the next CLK cycle.

TABLE 2

| Signal Name | Pin Count | I/O | Description |
| --- | --- | --- | --- |
| DRAM_ENA | 1 | I | Enable DRAM Operation next clock |
| DRAM_OP | 3 | I | DRAM Access Opcode |

TABLE 2-continued

| Signal Name | Pin Count | I/O | Description |
| --- | --- | --- | --- |
| DRAM_BANK | 2 | I | Bank Select for DRAM Operation |
| DRAM_ADDR | 9 | I | Address for DRAM Operation |

The frame buffer memory device controller 83 selects one of the DRAM banks A–D with the DRAM_BANK[1.0] signals. The frame buffer memory device controller 83 selects a page in the selected DRAM bank A–D via the DRAM_ADDR[8..0] signals. In addition, the frame buffer memory device controller 83 employs the DRAM_ADDR [8..0] signals to specify the pixel buffer global bus port address during block transfer operations over the global bus 60, and to specify transfers of video data from a DRAM page to one of the video buffers 52 and 54.

Table 3 lists the video control signals for one embodiment. The video control signals are employed to transfer video data to the video output circuit 84 over the video bus 134. The video data transferred over the video bus 134 is synchronized by the VID_CLK signal. The VID_CLK signal is a gated or free-running video shift clock. The $\overline{\text{VID\_CM}}$ signal is a synchronous signal used to mask the next VID_CLK cycle and disable a video counter in the FBRAM chip 71 that drives the video buffers 52 and 54. The $\overline{\text{VID\_OE}}$ signal is an asynchronous video output enable for the video data provided by VID_DATA signals. A 16 bit wide video data bus provided by the VID_DATA[15..0] signals which enables transfer of two bytes of video data during one cycle. The VID_QSF signal indicates whether the video buffer 52 or the video buffer 54 is driving the video data transferred via the VID_DATA[15..0] signals.

TABLE 3

| Signal Name | Pin Count | I/O | Description |
| --- | --- | --- | --- |
| VID_CLK | 1 | I | Video Clock |
| $\overline{\text{VID\_CM}}$ | 1 | I | Video Clock Mask |
| $\overline{\text{VID\_OE}}$ | 1 | I | Video Output Enable |
| VID_DATA | 16 | O | Video Data Bus |
| VID_QSF | 1 | O | Video Buffer Indicator |

Table 4 describes the pixel port operations of the FBRAM chip 71 for one embodiment. The pixel port operations include operations for reading data from the pixel buffer 56, operations for writing data to the pixel buffer 56 in four different modes, operations for replacing and modifying dirty tag bits in the dirty tags memory 194, and an operation for writing to the control registers of the FBRAM chip 71.

TABLE 4

| PA_ENA | PA_WE | PA_OP | PA_ADDR | Operation |
| --- | --- | --- | --- | --- |
| 00 | — | — | — | NOP |
| 11 | 0 | 000 | Block:Word | Read data from Pixel Buffer |
| 11 | 1 | 000 | Block:Word | Stateless initial data write |
| 11 | 1 | 001 | Block:Word | Stateless normal data write |
| 11 | 1 | 010 | Block:Word | Stateful initial data write |
| 11 | 1 | 011 | Block:Word | Stateful normal data |

TABLE 4-continued

| PA_ENA | PA_WE | PA_OP | PA_ADDR | Operation |
|---|---|---|---|---|
| 11 | - | 1 | 100 | Block:xxx write Replace Dirty Tag |
| 11 | 1 | | 101 | Block:xxx Or Dirty Tag |
| 11 | 1 | | 111 | Register Write control registers |

The frame buffer memory device controller 83 specifies block and word addresses for pixel port operations via the PA_ADDR[5..0] signals. The rendering processor 70 specifies block addresses for the pixel ALU operations via the PA_ADDR[5..3] signals. The rendering processor 70 specifies word addresses for the pixel ALU operations via the PA_ADDR[2..0] signals. The rendering processor 70 specifies the control registers during control register write operations via the PA_ADDR[5..0] signals.

The frame buffer memory device controller 83 issues the read pixel port operation to read 32 bits of data from the pixel buffer 56. The block and word addresses in the Pixel buffer 56 are specified by the PA_ADDR[5.0] signals.

The frame buffer memory device controller 83 issues the stateless initial data write operation to write 32 bits of data to the block and word in the Pixel buffer 56 specified by the PA_ADDR[5..0] signals. The stateless initial data write operation sets the dirty tags in the addressed block corresponding to the 32 bits of data provided by PA_DQ[31..0] and clears the dirty tags in the addressed block not corresponding to the 32 bits of data provided by PA_DQ[31..0]. The stateless initial data write operation is unaffected by the contents of the control registers in the FBRAM chip 71. The stateless normal data write operation is also unaffected by the contents of the control registers in the FBRAM chip 71. The frame buffer memory device controller 83 issues the stateless normal data write operation to write 32 bits of data provided by the PA_DQ[31..0] signals to the block and word in the Pixel buffer 56 specified by the PA_ADDR [5..0] signals. The stateless normal data write operation sets the dirty tags corresponding to the 32 bits of data provided by PA_DQ[31..0].

The frame buffer memory device controller 83 issues a stateful initial data write operation to write 32 bits of data to the Pixel buffer 56 according to the contents of the control registers in the FBRAM chip 71. The stateful initial data write operation also sets and clears the dirty tags in the same manner as the stateless initial data write operation. The frame buffer memory device controller 83 issues the stateful normal data write operation to write 32 bits of data to the Pixel buffer 56 according to the contents of the control registers in the FBRAM chip 71. The stateful normal data write operation also sets the dirty tags in the same manner as the stateless normal data write operation. The frame buffer memory device controller 83 specifies the block and word in the Pixel buffer 56 via the PA_ADDR[5..0] signals, and provides new data via the PA_DQ[31..0] signals. The new data may be combined with the existing data in the addressed block and word according to the contents of the registers in the FBRAM chip 71 that control pixel ALU operations.

The frame buffer memory device controller 83 issues the replace dirty tag operation to transfer dirty tag data via the PA_DQ[31..0] signals to the dirty tags memory 194. The frame buffer memory device controller 83 issues the OR dirty tag operation to perform an inclusive OR function on new tag data and existing tag data in the dirty tags memory. The frame buffer memory device controller 83 issues the write control register operation to transfer new data into an internal control register of the FBRAM chip 71.

Table 5 lists the DRAM access operations provided by the FBRAM chip 71 for one embodiment. The DRAM access operations include page access operations, block access operations, and video buffer load operations. The page access operations include an access page operation, a precharge operation, and a duplicate page operation. The block access operations include read block operations, unmasked write block operations, and masked write block operations. The frame buffer memory device controller 83 can launch a DRAM access operation each cycle on the DRAM operation bus 110.

TABLE 5

| Operation | DRAM_OP | DRAM_BANK | DRAM_ADDR |
|---|---|---|---|
| Unmasked Write Block (UWB) | 000 | Bank | SRAM Block (3 pins), DRAM Block (6 pins) |
| Masked Write Block (MWB) | 001 | Bank | SRAM Block (3 pins), DRAM Block (6 pins) |
| Precharge Bank (PRE) | 010 | Bank | — |
| Video Transfer (VDX) | 011 | Bank | Ctrl (2 pins), Line (4 pins) |
| Duplicate Page (DUP) | 100 | Bank | Page (9 pins) |
| Read Block (RDB) | 101 | Bank | SRAM Block (3 pins), DRAM Block (6 pins) |
| Access Page (ACP) | 110 | Bank | Page (9 pins) |
| No Operation (NOP) | 111 | — | — |

The frame buffer memory device controller 83 launches page access operations to select pages of the DRAM banks A–D. The frame buffer memory device controller 83 specifies the DRAM bank A–D via the DRAM_BANK signals and specifies the accessed page via the DRAM_ADDR [8..0] signals.

The frame buffer memory device controller 83 launches block access operations to transfer blocks of data between the page buffers A–D and the pixel buffer 56. The frame buffer memory device controller 83 specifies the DRAM bank A–D and the page buffer A–D via the DRAM_BANK signals. The frame buffer memory device controller 83 specifies the pixel cache block in the pixel buffer 56 via the DRAM_ADDR[8..6] signals, and selects a block of the specified page buffer A–D via the DRAM_ADDR[5..0] signals.

The frame buffer memory device controller 83 issues an unmasked write block operation to transfer a block of data from the specified block of the pixel buffer 56 to the specified block of the specified page buffer A–D over the global bus 60. The dirty tag bits in a dirty tags memory that corresponds to the specified block of the pixel buffer 56 control byte wise writes to the specified page buffer A–D.

The frame buffer memory device controller 83 issues a masked write block operation to transfer a block of data from the specified pixel cache block of the pixel buffer 56 to the specified block of the specified page buffer A–D over the global bus 60. The plane mask register and the dirty tag bits for the specified pixel cache block of the pixel buffer 56 control bitwise writes to the page buffer A–D of the specified DRAM bank A–D.

The frame buffer memory device controller 83 issues a precharge bank operation to precharge the sense amplifiers in the specified DRAM Bank A–D. The frame buffer memory device controller 83 issues a precharge bank operation in preparation for a subsequent access page operation.

The frame buffer memory device controller 83 issues a video transfer operation to transfer a 640 bit line of sense amp data from the specified page buffer A–D to the corresponding video buffer 52 or 54. The rendering processor 70 uses the DRAM_ADDR[3..0] signals to specify the line from the page buffer A–D.

The frame buffer memory device controller 83 issues a duplicate page operation to transfer sense amp data in the specified page buffer A–D to the specified page in the corresponding DRAM bank A–D. The frame buffer memory device controller 83 The rendering processor 70 issues a read block operation to transfer a block of data from the specified block of the specified page buffer A–D to the specified pixel cache block of the pixel buffer 56 over the global bus 60. The read block operation clears the dirty tag bits for the specified pixel cache block of the pixel buffer 56.

The frame buffer memory device controller 83 issues an access page operation to transfer data from the specified page in the specified DRAM bank A–D to the corresponding sense amps in the page buffers A–D. The frame buffer memory device controller 83 precedes an access page operation to a particular DRAM bank A–D by a precharge operation to that DRAM bank.

For additional information regarding example FBRAM chips such as the FBRAM chip 71 refer to U.S. patent application Ser. No. 08/237,289, filed on May 3, 1994 and entitled Frame Buffer Random Access Memory and System.

Figure 3:
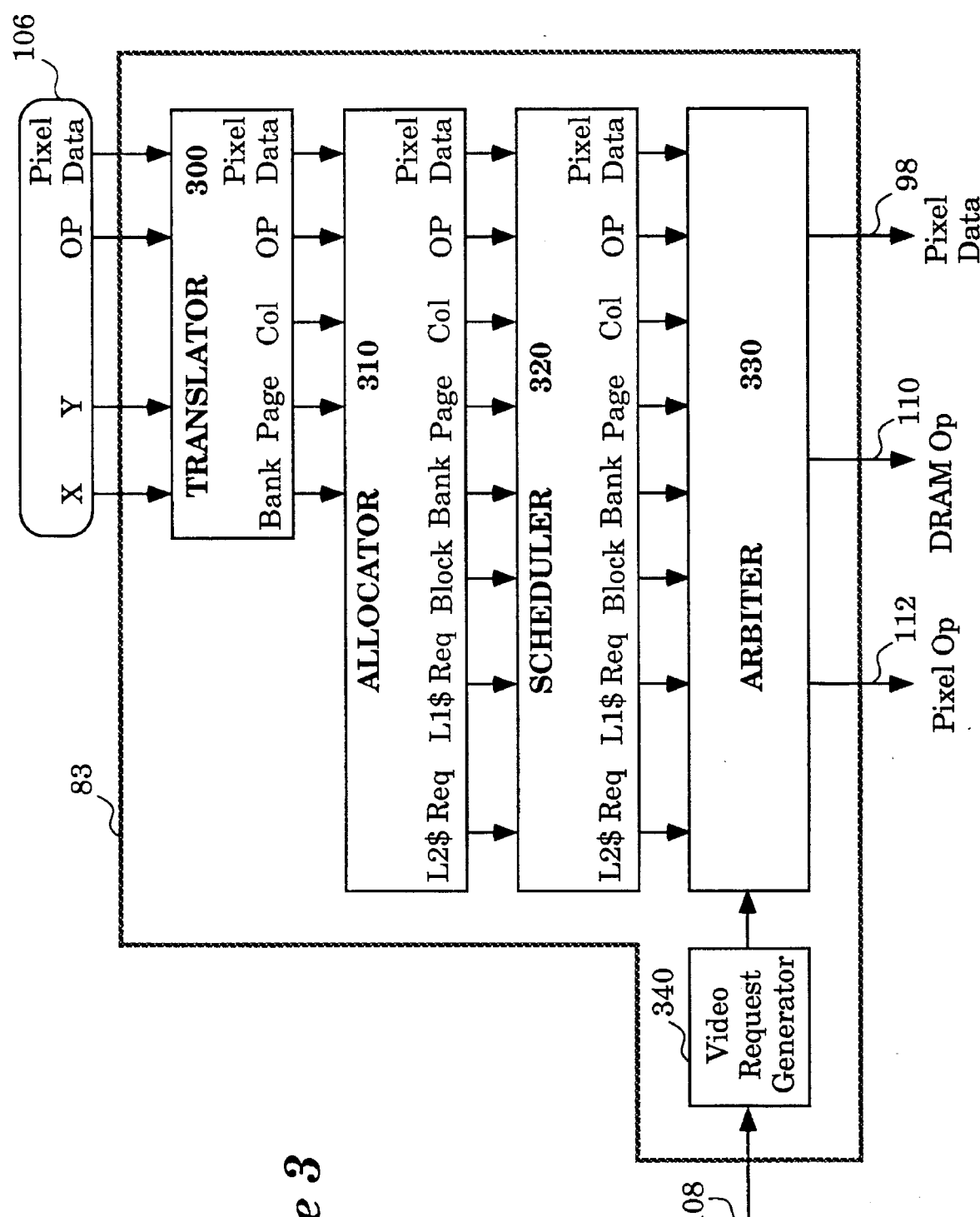
FIG. 3 illustrates the frame buffer memory device controller for one embodiment which comprises a translator circuit, an allocator circuit, a scheduler circuit, an arbiter circuit, and a video request generator.

FIG. 3 illustrates the frame buffer memory device controller 83 for one embodiment. The frame buffer memory device controller 83 comprises a translator circuit 300, an allocator circuit 310, a scheduler circuit 320, an arbiter circuit 330, and a video request generator 340.

The pixel access transactions received by the frame buffer memory device controller 83 over the frame buffer control bus 106 eventually result in the issuance of operations over the pixel operation bus 112 and the rendering bus 98. The frame buffer memory device controller 83 issues DRAM operations over the DRAM operation bus 110 to transfer data between the DRAM core and the L1 pixel cache via the L2 pixel cache of the FBRAM chips 71–82 in support of the pixel operations.

The frame buffer memory device controller 83 determines the DRAM operations issued on the DRAM operation bus 110 according to the sequence of pixel access transactions received over the frame buffer control bus 106. For example, if the pixel data specified by a pixel access transaction received over the frame buffer control bus 106 is not stored in the L1 pixel cache of the FBRAM chips 71–82, then the appropriate block must be transferred into the L1 pixel cache of the FBRAM chips 71–82. In addition, if the pixel specified by the pixel access transaction on the frame buffer control bus 106 is not contained in the L2 pixel cache, then the appropriate page must first be transferred into the L2 pixel cache before the specified block is transferred from the L2 pixel cache to the L1 pixel cache of the FBRAM chips 71–82.

The frame buffer memory device controller 83 ensures that modified blocks in the L1 pixel cache are appropriately written back into the L2 pixel cache over the global busses of the FBRAM chips 71–82. The frame buffer memory device controller 83 also ensures that pages in the L2 pixel cache are returned to the DRAM cores of the FBRAM chips 71–82 as appropriate.

The frame buffer memory device controller 83 issues video transfer sequences including ACP, VDX, and PRE operations to transfer video data from the DRAM banks A–D and the corresponding video buffers in the FBRAM chips 71–82.

The translator circuit 300 receives pixel access transactions over the frame buffer control bus 106. Each pixel access transaction on the frame buffer control bus 106 comprises an X and a Y address, an operation code (OP) and pixel data. The operation code specifies pixel write cycles, pixel read-modify-write cycles, pixel read cycles, register write cycles, register read cycles and block transfer functions for the FBRAM chips 71–82. The X and Y addresses specify coordinates for a display device for the corresponding pixel data.

The translator circuit 300 converts the received X and Y addresses into access parameters for the FBRAM chips 71–82. The access parameters for the FBRAM chips 71–82 comprise a bank, a page, and a column (COL) word. The bank specifies one of the banks A through D of the FBRAM chips 71–82. The page specifies a page within a selected bank, and the column specifies a portion of the selected page, and the word specifies a pixel portion of the selected column.

The allocator circuit 310 tracks the accumulated state of all requests to the scheduler that will affect the states of the internal L1 and L2 pixel caches of the FBRAM chips 71–82. The allocator circuit 310 maintains a log of the DRAM pages mapped into the L2 pixel caches, a log of the bank, page, and column for each entry in the L1 pixel cache of the FBRAM chips 71–82.

The allocator circuit 310 receives the bank, page, column, word and operation code from the translator circuit 300 and determines whether any changes are required to the states of the L1 and L2 pixel caches in the FBRAM chips 71–82 to perform the specified pixel access transaction. The allocator circuit 310 uses the bank, page, and column parameters from the translator circuit 300 to determine whether the specified pixel is contained in the L1 and L2 pixel caches.

The allocator circuit 310 passes the bank, page, column, word and operation (OP) code parameters received from the translator circuit 300 along with a block parameter to the scheduler 320. The allocator circuit 310 also transfers a corresponding L1 cache request (L1$ Req) to the scheduler circuit 320 if the specified pixel access transaction requires a future change to the state of the L1 pixel caches of the FBRAM chips 71–82. The allocator circuit 310 also transfers a corresponding L2 cache request (L2$ Req ) to the scheduler circuit 320 if the specified pixel access transaction requires a future change to the state of the L2 pixel cache in the FBRAM chips 71–82.

The L1 cache request from the allocator circuit 310 specifies transfers between the L1 and L2 pixel caches in the FBRAM chips 71–82. For example, the L1 cache request may specify a (RDB) prefetch operation that transfers data from the L2 pixel cache to the L1 pixel cache, or may specify a (UWB, MWB) writeback operation that writes back dirty pixel data from the L1 pixel cache to the L2 pixel cache over the global bus in each FBRAM chip 71–82. A single pixel operation may generate a writeback operation followed by a prefetch operation. In another embodiment, the writeback and prefetch are combined into one request to the scheduler circuit 320.

The L2 cache request specifies operations on the DRAM core in each FBRAM chip 71–82. For example, the L2 cache request from the allocator circuit 310 may specify an access page (ACP) operation for the DRAM core, or may specify a precharge (PRE) operation for the DRAM core. For another embodiment, the allocator circuit 310 specifies an access page operation to the scheduler circuit 320 and the arbiter circuit 330 expands this request into a precharge (if needed) followed by an access page.

The scheduler circuit 320 receives the pixel access block, bank, page, column and operation code parameters from the allocator circuit 310 along with the L1 and L2 cache requests from the allocator circuit 310. Scheduler circuit 320 buffers the pixel access parameters, the L1 cache request, and the L2 cache request in separate internal first-in-first-out (FIFO) memory queues. The separate memory queues operate independently, thereby enabling the L2 cache requests to "push" ahead of L1 cache requests and enabling L1 cache requests to push ahead of pixel access parameters.

The arbiter circuit 330 maintains logs of the current internal state of the FBRAM chips 71–82 according to the previously dispatched DRAM operations and pixel operations over the DRAM operation bus 110 and the pixel operation bus 112 respectively. The arbiter circuit 330 tracks the current state of the L1 and L2 pixel caches in the FBRAM chips 71–82. The arbiter circuit 330 also maintains a scoreboard indicating the five most recently issued pixel operations over the pixel operation bus 112.

The arbiter circuit 330 maintains an internal set of interlock circuitry for enforcing internal timing operations in the FBRAM chips 71–82. The arbiter circuit 330 also contains a state machine that tracks the cycles on the rendering bus 98 to ensure proper line turnaround during transitions between read and write cycles. The arbiter circuit 330 also tracks the internal state of the global busses in the FBRAM chips 71–82.

The arbiter circuit 330 receives video transfer requests from the video request generator 340. The video transfer requests from the video request generator 340 are determined by timing signals received from the video output circuit 84 over the video operation bus 106. Each video access request is also determined by transitions of the QSF flag from one of the FBRAM chips 71–82. Each video access request indicates whether a video transfer sequence in the FBRAM chips 71–82 is needed.

The arbiter circuit 330 issues L1 cache requests, L2 cache requests, and video transfer operation requests to the FBRAM chips 71–82 over the DRAM operation bus 110. The arbiter circuit 330 arbitrates the L1 cache requests, and the L2 cache requests from the scheduler circuit 320, and the video access requests from the video request generator 340 which are issued as DRAM operations on the DRAM operation bus 112 if the FBRAM chips 71–82 are ready to receive the DRAM operations. The arbiter circuit 330 issues pixel access transactions as pixel port operations over the pixel operation bus 110 and data over the rendering bus 98 if the FBRAM chips 71–82 are ready to receive the pixel access transactions.

Each FBRAM chip 71–82 provides independent sets of control and address pins coupled to the DRAM operation bus 110 and the pixel operation bus 112. The pixel operation bus 112 controls the reading and writing of pixels via the read port 204 and the write port 202 to and from the L1 pixel caches in the FBRAM chips 71–82. The DRAM operation bus 110 controls data transfers between the DRAM core and the L2 pixel cache, global bus 60 transfers between the L2 pixel cache and the L1 pixel cache, and video transfers from the L2 pixel cache to the corresponding video buffers in the FBRAM chips 71–82.

Figure 4:
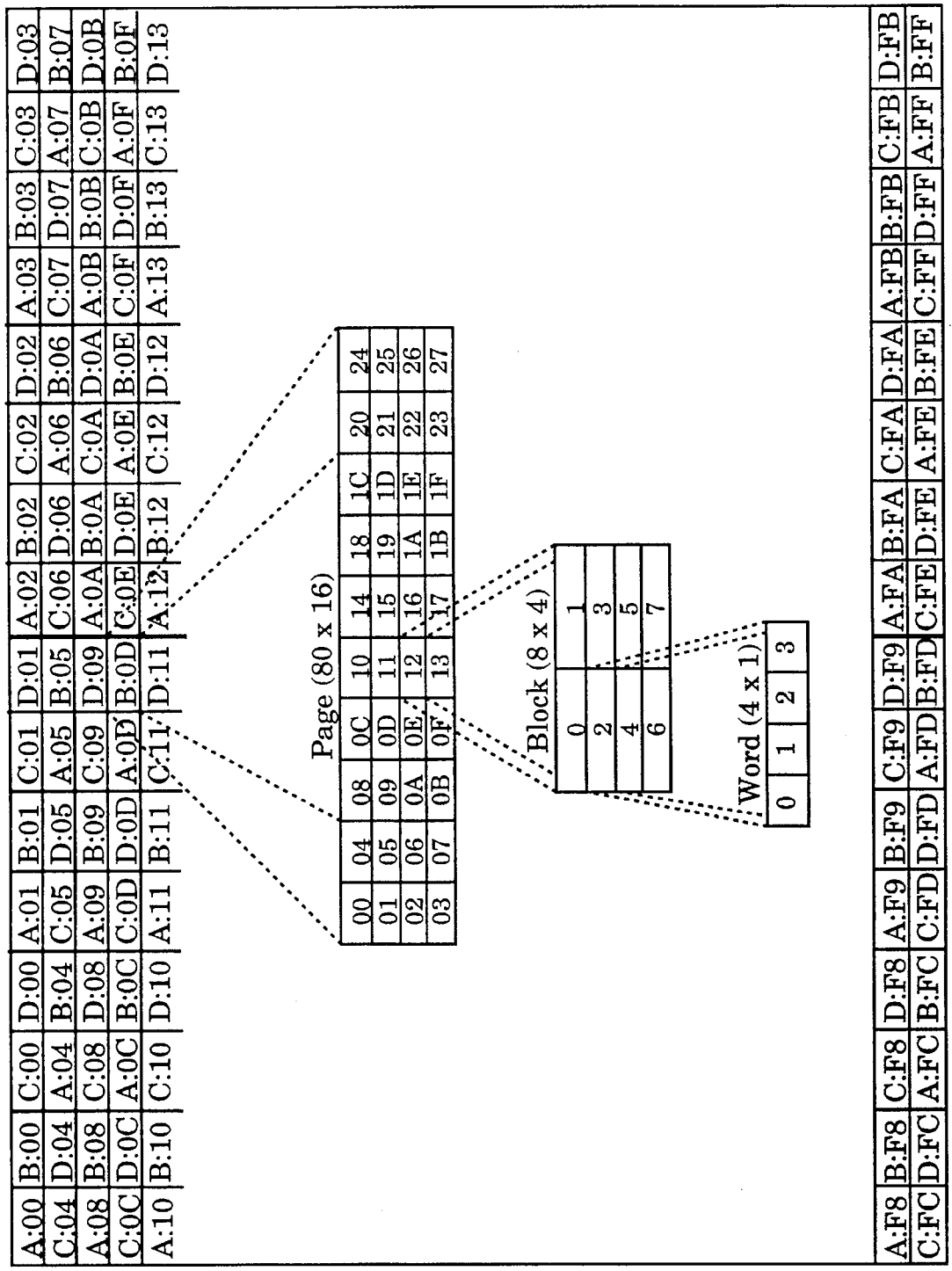
FIG. 4 illustrates the mapping of X and Y pixel addresses received over the frame buffer control bus into bank, page, block, and word parameters for the FBRAM chips by the translator circuit.

FIG. 4 illustrates the mapping of X and Y pixel addresses received over the frame buffer control bus 106 into bank, page, block, and word parameters for the FBRAM chips 71–82 by the translator circuit 300. The example shown illustrates a screen mapping for a 1280 by 1024 resolution display. Note that a two dimension pattern is used to map banks A through D, so that rendering a neighboring page will always use a different bank, allowing time to prefetch new banks and to evict old banks. The translator circuit 300 comprises a set of combinatorial logic that performs the conversion functions outlined below in Table I.

TABLE I

ADDRESS CONVERSION VERILOG CODE

| | |
|---|---|
| input X[11]; | // 0 <= X < 1280 |
| input Y[10]; | // 0 <= Y < 1024 |
| output BANK[2]; | // Selects 1 of 4 banks |
| output ROW[8]; | // Selects 1 of 256 pages in a bank |
| output COL[6]; | // Selects 1 of 40 blocks in a page |
| output WORD[3]; | // Selects 1 of 8 words in a block |
| output INTLV[2]; | // Selects 1 of 4 pixels in a word |
| register XdivPW[4]; | // x divided by width of page |
| register XmodPW[3]; | // x modulo width of page |
| XdivPW[3..0] | = X[10..4]/5; |
| XmodPW[2..0] | = X[10..4] % 5; |
| BANK[1] | = XdivPW[1] ^ Y[4]; |
| BANK[0] | = XdivPW[0]; |
| ROW[7..2] | = Y[9..4]; |
| ROW[1..0] | = XdivPW[3..2]; |
| COL[5..3] | = XmodPW[2..0]; |
| COL[2] | = X[3]; |
| COL[1..0] | = Y[3..2]; |
| WORD[2..1] | = Y[1..0]; |
| WORD[0] | = X[2]; |
| INTLV[1..0] | = X[1..0] |

Figure 5:
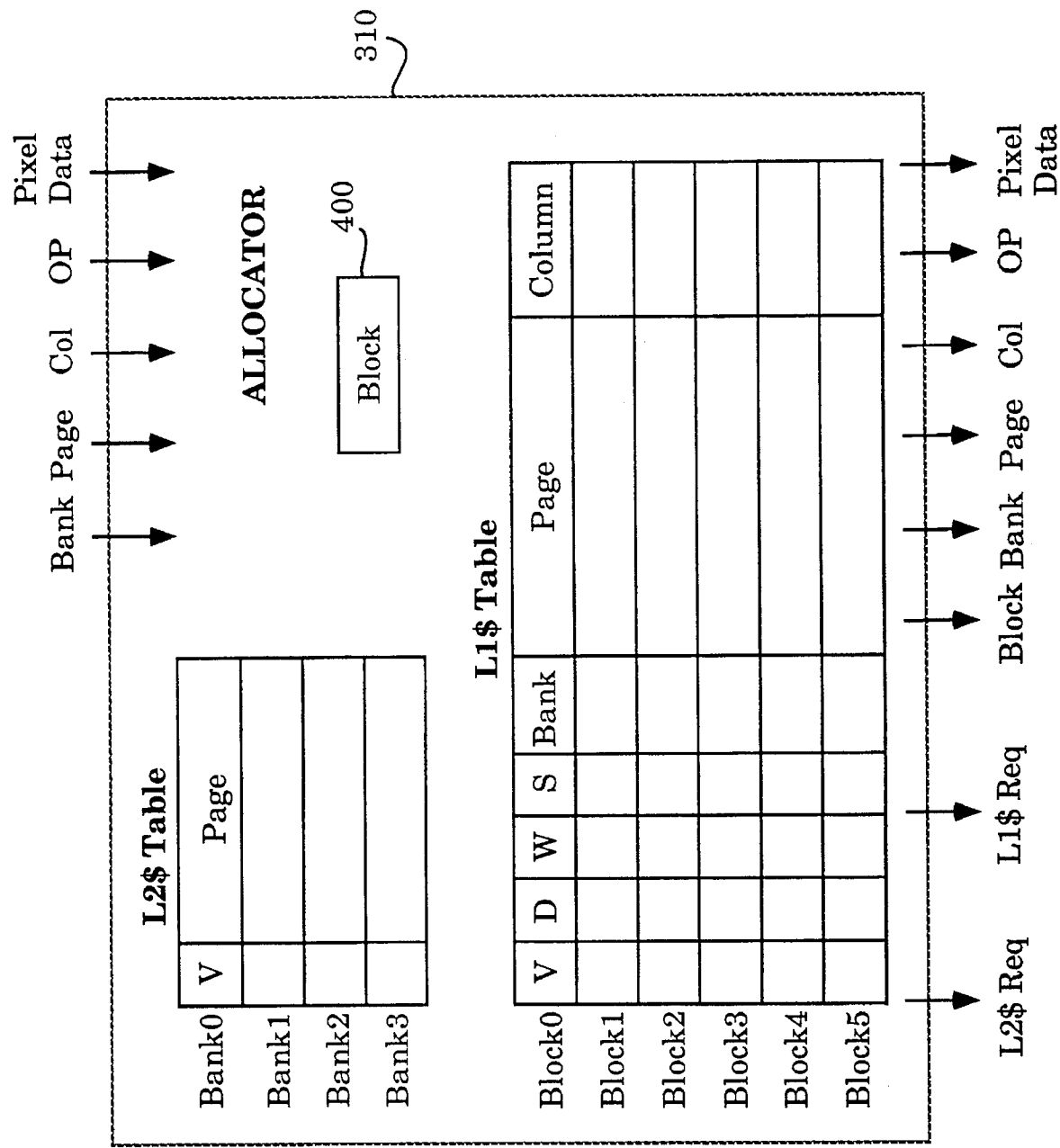
FIG. 5 illustrates the allocator circuit which determines whether L1 cache requests and L2 cache requests are required for incoming pixel accesses from the translator circuit.

FIG. 5 illustrates the allocator circuit 310 for one embodiment. The allocator circuit 310 determines whether L1 cache requests and L2 cache requests are required for incoming pixel accesses from the translator circuit 300. The allocator circuit 310 maintains an L1 cache table (L1$ Table), an L2 cache table (L2$ Table), and a least recently allocated block register 400.

The L2 cache table provides an entry for each of the banks A through D of the FBRAM chips 71–82 wherein banks A through D correspond to Bank0 through Bank3. Each entry in the L2 cache table includes a valid bit and a page field. The valid bit indicates whether a page from the corresponding bank A through D is mapped to the L2 pixel cache, and the page field specifies the page of the DRAM bank mapped.

In one embodiment, the allocator circuit 310 indexes the L2 cache table for each incoming set of pixel access parameters from the translator circuit 300. The allocator circuit 310 indexes the L2 cache table with the bank parameter from the translator circuit 300. The allocator circuit 310 compares the page field of the specified L2 cache table entry with the incoming page parameter from the translator circuit 300. If the incoming page parameter matches the page field of the specified L2 cache table entry, and if the corresponding valid bit is set, then the allocator circuit 310 does not issue an L2 cache request as the pixel access parameters are passed to the scheduler circuit 320. Otherwise, the allocator circuit 310 issues an appropriate L2 cache request to the scheduler circuit 320 and sets the appropriate L2 cache table entry to the incoming page parameter from the translator circuit 300.

In another embodiment, incoming requests from the translator which miss in the L2 cache table but which hit in the L1 cache table do not cause the allocator to schedule an L2 cache request. Instead, a subsequent request to the translator which requires a L1 cache eviction will first generate a L2 request to schedule the page before generating a L1 request to evict the block.

Each entry in the L1 cache table includes a valid bit (V), a dirty bit (D), a write only bit (W), a stateful bit (S), a bank field, a page field, and a column field. The dirty bit indicates that the corresponding block of the L1 pixel cache contains updated pixels which must be written back to the L2 pixel cache before the L1 block can be reallocated. The valid bit indicates whether a block from the L2$ is mapped to the corresponding L1$ block. The stateful bit indicates whether stateful or stateless write operations are required for the corresponding block of the L1 pixel cache. The write only bit indicates that global bus read transactions are not required for the corresponding block of the L1 pixel cache.

In one embodiment, the allocator circuit 310 ensures that the L1 pixel cache is always a subset of the L2 pixel cache. The L1 cache table is fully associative. The allocator circuit 310 compares the incoming bank page and column parameters from the translator circuit 300 to all six entries in the L1 cache table simultaneously. If the incoming pixel access parameters do not correspond to an entry in the L1 cache table, then the entry in the L1 cache table indicated by the least recently allocated counter 400 is evicted by the allocator circuit 310. The 3-bit index of the specified L1 cache table entry is then transferred to a scheduler circuit 320 as the L1 cache request along with the remaining pixel access parameters received from the translator circuit 300. The least recently allocated counter 400 is then incremented modulo 6. If the entry in the L1 cache table specified by the least recently allocated counter 400 is dirty, then the allocator circuit 310 issues an L1 cache request to the scheduler circuit 320 to write back the dirty block. In addition, the specified entry of the L1 cache table is set to clean.

In another embodiment, the L1 pixel cache is not always a subset of the L2 pixel cache. Once again, the L1 cache table is fully associative. The allocator circuit 310 compares the incoming bank page and column parameters from the translator circuit 300 to all six entries in the L1 cache table simultaneously. If the incoming pixel access parameters do not correspond to an entry in the L1 cache table, then the entry in the L1 cache table indicated by the least recently allocated counter 400 is deallocated by the allocator circuit 310. If the entry in the L1 cache table specified by the least recently allocated counter 400 is dirty, then the allocator circuit 310 issues an L1 cache request to the scheduler circuit 320 to write back the dirty block. If the L2 page used by the evicted L1 block is not valid in the L2 table, L2 requests to evict the old page and to fetch the needed page are transferred to the scheduler. In addition, the specified entry of the L1 cache table is set to clean. Once the deallocated block has been evicted, the 3-bit index of the specified L1 cache table entry is then transferred to a scheduler circuit 320 as a L1 cache fetch request along with the remaining pixel access parameters received from the translator circuit 300. The least recently allocated counter 400 is then incremented modulo 6. If the page used by the L1 cache fetch request is not valid in the L2 table, L2 requests to fetch the needed page are also transferred to the scheduler circuit 320.

Other embodiments can use a least recently used block register instead of a least recently allocated block register.

In another alternative embodiment, the requests from the translator circuit 300 to the allocator circuit 310 are queued. The choice to determine which cache entry is the most suitable to evict can not only look at what operations have already been scheduled for execution, but can also look at the queue of incoming pixel operations to avoid evicting a block that will soon be needed by incoming pixels.

The allocator circuit 310 checks the dirty bit of the specified entry in the L1 cache table to determine whether a writeback operation from the L2 pixel cache is required. The corresponding S bit indicates whether an unmasked write block or a masked write block is used for the writeback from the L1 pixel cache to the L2 pixel cache.

Figure 6:
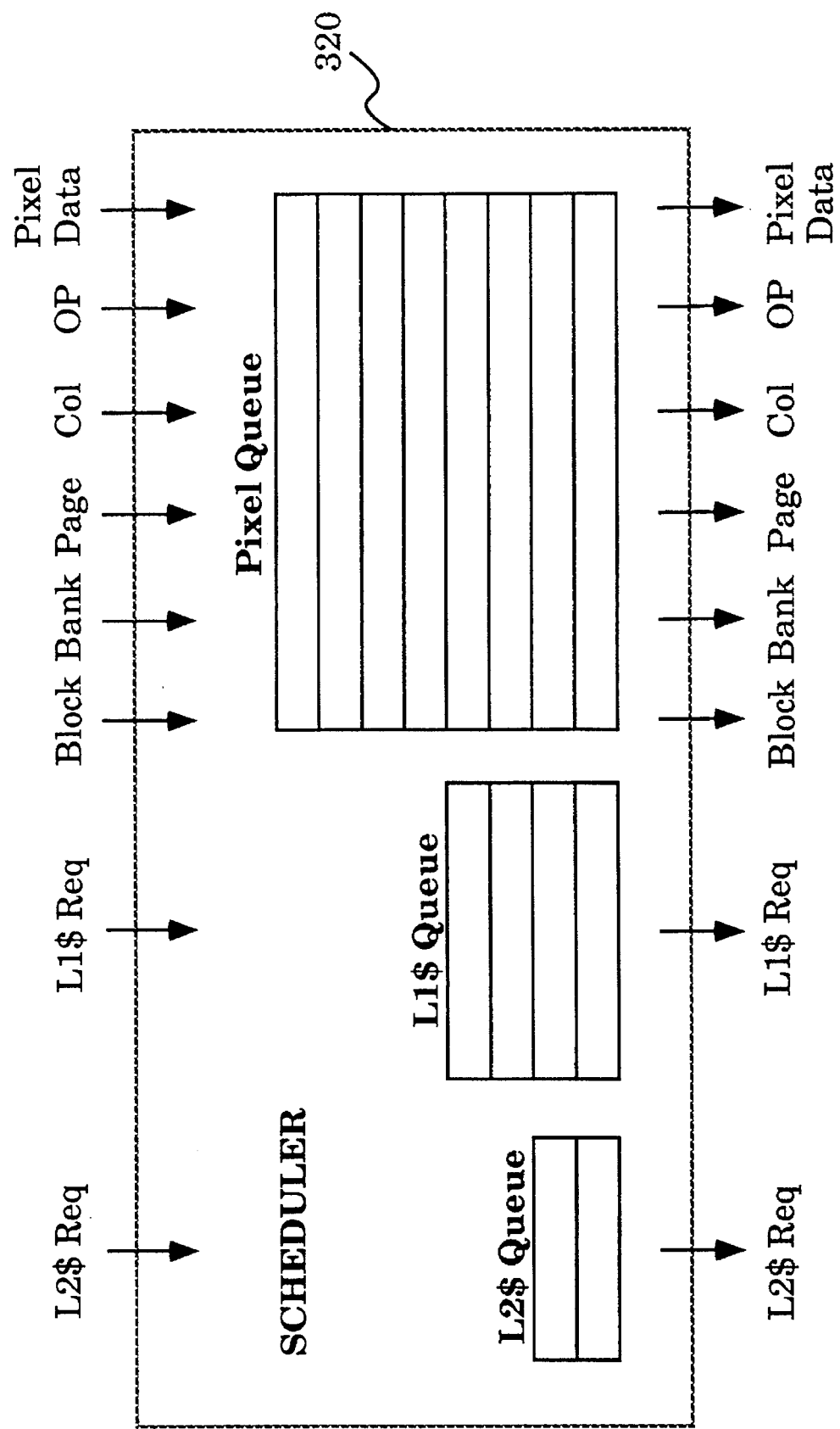
FIG. 6 illustrates the scheduler circuit which places the pixel access parameters in a pixel queue, and which places the L1 cache requests in an L1 cache queue (L1$ Queue), and which places the L2 cache requests in an L2 cache queue (L2$ Queue).

FIG. 6 illustrates the scheduler circuit 320 for one embodiment. The scheduler circuit 320 receives pixel access parameters including block, bank, page, column, operation code, and pixel data parameters from the allocator circuit 310 and places the pixel access parameters in a pixel queue. The scheduler circuit 320 receives L1 cache requests from the allocator circuit 310 and places the L1 cache requests in an L1 cache queue (L1$ Queue). The scheduler circuit 320 receives L2 cache requests from the allocator circuit 310 and places the L2 cache requests in an L2 cache queue (L2$ Queue). The pixel queue, the L1 cache queue, and the L2 cache queue each comprise a first-in-first-out buffer memory.

The scheduler circuit 320 attempts to push L2 cache requests ahead of unrelated L1 cache requests to a different bank than the L2 cache request and to push L1 cache requests ahead of unrelated pixel access requests to a different block than the L1 cache requests. The pixel queue is deeper than the L1 cache queue, which in turn is deeper than the L2 cache queue to push ahead the corresponding requests. The pixel queue, the L1 queue, and the L2 cache queue operate independently, thereby enabling L2 cache requests to move ahead of previously received L1 cache requests and pixel access requests. Similarly, L1 cache requests are able to move ahead of previously received pixel access requests in the pixel queue.

This "push ahead" strategy is very advantageous because most L2 operations take longer to complete than L1 operations and most L1 operations take longer to complete than pixel operations. On the other hand, the L2 page area is greater than the L1 block area which is greater than the pixel area. As a result, there are usually multiple pixel requests per L1 request and multiple L1 requests per L2 request. By pushing the slower L2 and L1 requests ahead of the more numerous L1 and pixel requests, the chances are greatly increased that the slower requests will be completed before they are required to support the more numerous pixel requests, thus avoiding the need to stall the pixel requests.

The scheduler circuit 320 prevents L2 cache requests from pushing ahead of related L1 cache requests to the same bank and page as the L2 cache request. The scheduler circuit 320 compares the bank parameter of each incoming L2 cache request from the allocator circuit 310 to the bank field of each L1 cache queue entry. If the bank field matches any valid L1 cache queue entry, then the incoming L2 cache request is stalled by the scheduler circuit 320. The scheduler circuit 320 stalls L2 cache requests if the bank field of the cache request matches the bank field of valid L1$ queue entries to prevent L2$ entries from changing before all corresponding L1$ queue entries are written back.

The scheduler circuit 320 prevents L1 cache requests from pushing ahead of related pixel access requests to the same block as the L1 cache request. The scheduler circuit 320 compares the block parameter of each incoming L1 cache request from the allocator circuit 310 to the block field of each entry in the pixel queue. If the incoming block parameter matches any entry in the pixel queue, then the incoming L1 cache request is stalled by the scheduler circuit 320.

Figure 7:
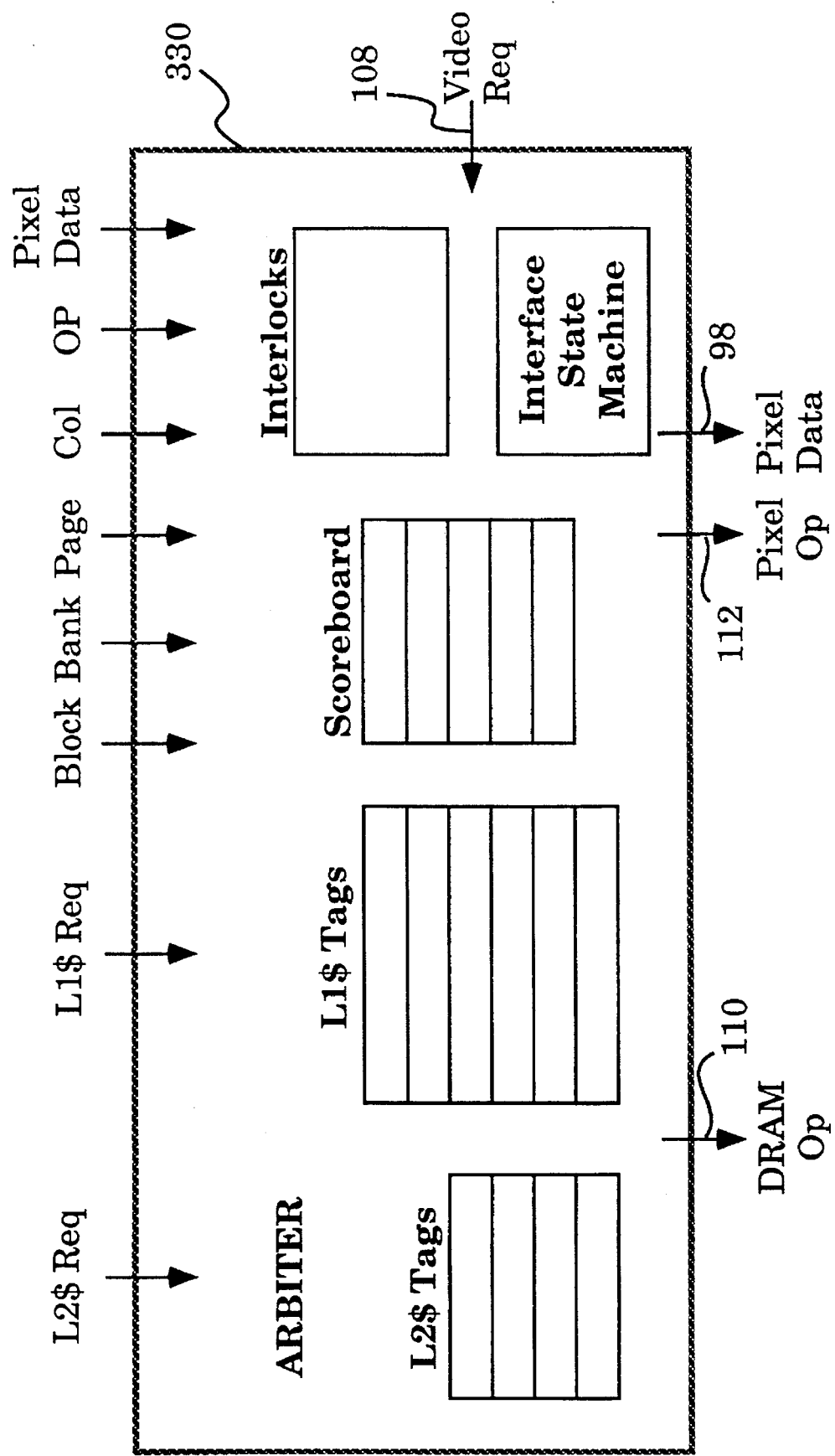
FIG. 7 illustrates the arbiter circuit which maintains a set of L2 cache tags (L2$ Tags), a set of L1 cache tags (L1$ Tags), a scoreboard, a set of interlocks, and includes an interface state machine.

FIG. 7 illustrates the arbiter circuit 330 for one embodiment. The arbiter circuit 330 maintains a set of L2 cache tags (L2$ Tags), a set of L1 cache tags (L1$ Tags), a scoreboard, a set of interlocks, and includes an interface state machine. The arbiter circuit 330 selects one DRAM operation and one pixel operation for transfer to the FBRAM chips 71–82 during each cycle on the operation busses 110 and 112. The arbiter circuit 330 maintains a detailed model of the internal state of the FBRAM chips 71–82 to ensure that DRAM and pixel operations are properly issued.

The L1 cache tags and the L2 cache tags indicate the state of the L1 and L2 pixel caches in the FBRAM chips 71–82. The scoreboard tracks the state of the pixel ALU pipeline inside the FBRAM chips 71–82. The interlocks track the hardware timing requirements of the FBRAM chips 71–82 for DRAM operations. The interface state machine maintains proper line turn around and supports extended read cycles to the data pins of the FBRAM chips 71–82.

The arbiter circuit 330 compares incoming pixel access parameters from the scheduler circuit 320 with information in the scoreboard. The information in the scoreboard ensures that operations currently underway in the pixel ALUs of the FBRAM chips 71–82 will not interfere with the incoming pixel access request. The incoming pixel access parameters are also compared to the L1 cache tags to ensure that the specified pixel data is available in the L1 pixel cache of the FBRAM chips 71–82. The incoming pixel access operation field is compared with the current state of the interface state machine to determine if the data bus can be used. If a conflict with the scoreboard, a conflict with the L1 cache tags, or a conflict in the interface state machine is detected by the arbiter circuit 330, then the incoming pixel access parameters from the scheduler circuit 320 are stalled.

The arbiter circuit 330 compares incoming L1 cache requests from the scheduler circuit 320 to the L2 cache tags to ensure that the required DRAM page is available in the L2 pixel cache. The arbiter circuit 330 compares incoming L1 cache write requests with the scoreboard to ensure that all pending pixel writes are completed to the specified L1 cache block before the L1 cache block is transferred to the L2 pixel cache. The arbiter circuit 330 compares all incoming L1 cache requests to the interlocks to ensure that the global busses of the FBRAM chips 71–82 are not busy. In addition, the arbiter circuit 330 compares incoming L2 cache requests from the scheduler circuit 320 to the interlocks.

FIG. 8 illustrates the L2 cache tags in the arbiter circuit 330. Each entry of the L2 cache tags includes a bit indicating the state of the corresponding DRAM bank A through D. The bit indicates whether the DRAM bank A through D is accessed or precharged. In addition, each entry of the L2 cache tags includes a page field. The state bit of each L2 cache tags entry is set (A) by an access page operation which indicates that a specified subset of DRAM operations in the FBRAM chips 71–82 may be performed. The specified set of DRAM operations includes duplicate page, read block, mask write block, unmasked write block, video transfer and precharge. The state bit is cleared by a precharge operation and indicates that an access page or precharge operation can be performed.

FIG. 9 illustrates the format of the L1 cache tags in the arbiter circuit 330 for one embodiment. The L1 cache tags provide information similar to the L1 cache table in the allocator circuit 310 but with more current state information for the FBRAM chips 71–82.

Figure 10:
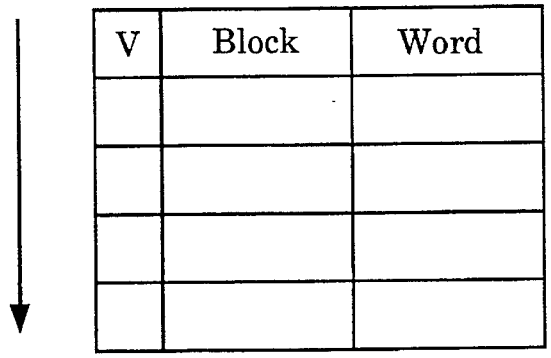
FIG. 10 illustrates the format of the scoreboard in the arbiter circuit which tracks pixel access operations that flow through the pipelined pixel ALUs in the FBRAM chips.

FIG. 10 illustrates the format of the scoreboard in the arbiter circuit 330. The scoreboard tracks pixel access operations that flow through the pipelined pixel ALUs in the FBRAM chips 71–82. The scoreboard keeps track of the block and word addresses of the pixel operations issued to the FBRAM chips 71–82 during the previous five cycles over the rendering bus 98. The arbiter circuit 330 stalls pixel access operations that read from the L1 pixel cache if earlier dispatched pixel writes the same block and word are still propagating through the pipeline of the pixel ALU as indicated in the scoreboard.

The scoreboard also coordinates pixel ALU operations in the FBRAM chips 71–82 with transfers between the L1 and L2 (writeback or UWB, MWB) caches. Transfers between the L1 and L2 caches are stalled by the arbiter circuit 330 if pixel write operations to the specified L1 cache block are propagating through the pipeline of the pixel ALU as indicated in the scoreboard.

Each scoreboard entry includes a valid bit, a block field, and a word field. The arbiter circuit 330 sets the valid bit of an entry when pixel write operations are issued to the FBRAM chips 71–82. The block and word addresses of the corresponding entry are copied from the parameters for the corresponding pixel access operation received from the scheduler circuit 320. The arbiter circuit 330 advances the scoreboard entries every cycle.

The arbiter circuit 330 compares each incoming pixel access operation from the scheduler circuit 320 with all five entries in the scoreboard. If the incoming pixel access operation specifies a read from an L1 cache block in the scoreboard, and if the corresponding valid bit is set, and if the corresponding block and word fields of the scoreboard entry match, then the incoming pixel access operation is stalled. The scoreboard is ignored for incoming pixel access operations that do not require a read from the L1 pixel cache. In addition, the arbiter circuit 330 compares each incoming L1$ cache request that specifies a transfer from the L1 to the L2 pixel caches with the valid and block fields of each entry of the scoreboard. Such operations include unmasked write block operations and masked write block operations. If the block field of an entry in a scoreboard matches the incoming request, and if the corresponding valid bit is set, then the L1 cache request is stalled by the arbiter circuit 330.

Interlocks are provided to enforce the timing specifications of the FBRAM devices. The interlocks in the arbiter comprise a set of counters. They include two intrabank counters for each of the DRAM banks A through D, one interbank counter and one global bus counter. These counters are loaded with certain values when corresponding DRAM operations are issued to the FBRAM and then count down every cycle. Certain types of DRAM operations are stalled when corresponding counters are not zero.

The intrabank duration counter is loaded whenever a DRAM operation is issued to the counter's bank. The value loaded into the intrabank duration counter depends upon the type of DRAM operation. DRAM operations to a bank are stalled if the bank's intrabank duration counter is not zero.

The intrabank precharge counter is loaded when a ACP operation is issued to the counter's bank. Precharge operations to a bank are stalled if the bank's intrabank precharge counter is not zero.

The interbank counter is loaded whenever a ACP, DUP, or VDX DRAM operation is issued to the FBRAM. ACP, DUP, VCX, and PRE DRAM operations are stalled if the interbank counter is not zero.

The global bus counter is loaded whenever a RDB, UWB, or MWB DRAM operation is issued to the FBRAM. RDB, UWB, and MWB DRAM operations stalled if the global bus counter is not zero.

Another interlock stalls pixel operations to a L1 cache block that is being transferred on the global bus.

Figure 11:
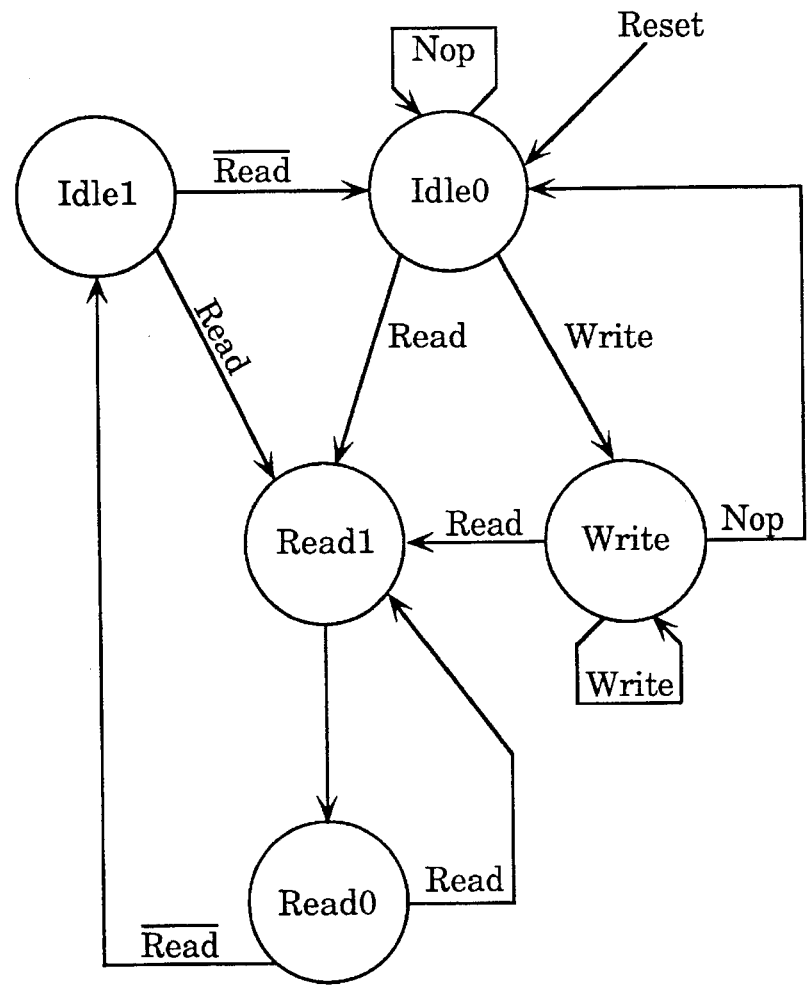
FIG. 11 illustrates the interface state machine in the arbiter circuit which controls the operation of the bi-directional bus between the frame buffer memory device controller and the FBRAM chips.

FIG. 11 illustrates the interface state machine in the arbiter circuit 330. The interface state machine controls the operation of the bi-directional bus 98 between the frame buffer memory device controller 83 and the FBRAM chips 71–82. The interface state machine accounts for the fact that write transactions of the rendering bus 98 require one cycle. Read transactions over the rendering bus 98 require two cycles. The interface state machine also ensures that two idle cycles are inserted between a read operation and a subsequent write operation over the rendering bus 98.

The video request generator 340 receives timing signals over the video operation bus 108 from the video output circuit 84. The video request generator 340 also receives the QSF signal from one of the FBRAM chips 71–82. The timing signals on the video operation bus 108 indicate the start of each frame and each scan line for a display device driven over a set of video lines 104 by the video output circuit 84. The QSF signal indicates when a video transfer operation should be issued to the FBRAM chips 71–82.

The video request generator 340 issues a video transfer request comprising a mode field, a bank field, and a page field along with a scanline address field to the arbiter circuit 330. The arbiter circuit 330 uses the video transfer request to generate a sequence of DRAM operations for the FBRAM chips 71–82. The DRAM operations comprise an access page operation to a specified bank and page, a video transfer operation to a specified bank and scanline and a precharge operation to a specified bank.

In the foregoing specification the invention has been described with reference to specific exemplary embodiments thereof it will, however, be evident that various modifications and changes may be made thereto without departing from the broader spirit and scope of the invention as set forth in the appended claims. The specification and drawings are accordingly to be regarded as illustrative rather than restrictive.

What is claimed is:

1. A frame buffer memory device controller coupled to receive a pixel access transaction targeted for pixel data mapped in at least one frame buffer memory device, the frame buffer memory device controller having circuitry for determining a cache state of the frame buffer memory device based on previous pixel access transactions, and circuitry for scheduling a cache transfer operation and for dispatching the cache transfer operation to the frame buffer memory device before dispatching the pixel access transaction to the frame buffer memory device.

2. The frame buffer memory device controller of claim 1, wherein the cache state of the frame buffer memory device indicates whether the pixel data is mapped to a level one pixel cache in the frame buffer memory device.

3. The frame buffer memory device controller of claim 2, wherein the cache transfer operation causes the frame buffer memory device to map the pixel data to the level one pixel cache if the cache state indicates that the pixel data is not mapped to the level one pixel cache.

4. The frame buffer memory device controller of claim 3, wherein the cache transfer operation causes the frame buffer memory device to transfer the pixel data between the level one pixel cache and a level two pixel cache in the frame buffer memory device.

5. The frame buffer memory device controller of claim 1, wherein the cache state of the frame buffer memory device indicates whether the pixel data is mapped to a level two pixel cache in the frame buffer memory device.

6. The frame buffer memory device controller of claim 5, wherein the cache transfer operation causes the frame buffer memory device to map the pixel data to the level two pixel cache if the cache state indicates that the pixel data is not mapped to the level two pixel cache.

7. The frame buffer memory device controller of claim 6, wherein the cache transfer operation causes the frame buffer memory device to transfer the pixel data between the level two pixel cache and a dynamic random access memory (DRAM) core in the frame buffer memory device.

8. The frame buffer memory device controller of claim 7, wherein the cache transfer operation causes the frame buffer memory device to transfer the pixel data into a video buffer from the level two pixel cache in the frame buffer memory device.

9. A frame buffer memory device controller coupled to receive a sequence of pixel access transactions targeted for pixel data mapped in at least one frame buffer memory device, the frame buffer memory device controller having circuitry for examining the sequence of pixel access transactions, and circuitry for scheduling a series of cache transfer operations in the frame buffer memory device to accommodate the sequence of pixel access transactions, and having circuitry for dispatching the cache transfer operations to the frame buffer memory device ahead of the pixel access transactions to the frame buffer memory device such that the cache transfer operations prevent stalls in the sequence of pixel access transactions to the frame buffer memory device.

10. The frame buffer memory device controller of claim 9, wherein the cache transfer operations include a level one cache operation that causes the frame buffer memory device to map the pixel data to a level one pixel cache in the frame buffer memory device.

11. The frame buffer memory device controller of claim 10, wherein the level one cache operation causes the frame buffer memory device to transfer the pixel data between the level one pixel cache and a level two pixel cache in the frame buffer memory device.

12. The frame buffer memory device controller of claim 11, wherein the cache transfer operations include a level two cache operation that causes the frame buffer memory device to map the pixel data to the level two pixel cache.

13. The frame buffer memory device controller of claim 12, wherein the level two cache operation causes the frame buffer memory device to transfer the pixel data between the level two pixel cache and a dynamic random access memory (DRAM) core in the frame buffer memory device.

14. The frame buffer memory device controller of claim 13, wherein the level two cache operation is dispatched ahead of the level one cache operation and wherein the level one cache operation is dispatched ahead of the corresponding pixel access transaction.

15. The frame buffer memory device controller of claim 9, wherein the cache transfer operations include a video transfer operation that causes the frame buffer memory device to transfer the pixel data into a video buffer from the level two pixel cache in the frame buffer memory device.

16. A frame buffer memory device controller comprising:

a translator, wherein said translator receives pixel access transactions targeted for pixel data mapped in a frame buffer memory device and converts said pixel access transactions into access parameters for said frame buffer memory device;

an allocator coupled to said translator, wherein said allocator receives said access parameters from said translator and determines a cache state of said frame buffer memory device based on previous pixel access transactions;

a scheduler coupled to said allocator, wherein said scheduler buffers requests received from said allocator, an arbiter coupled to said scheduler and a video request generator, wherein said arbiter receives instructions from said scheduler and said video request generator and issues requests to said frame buffer memory device such that a cache transfer operation to said frame buffer memory device is performed before dispatching said pixel access transaction to said frame buffer memory device.

17. The frame buffer memory device controller of claim 16, wherein said translator receives a pixel address, an operation code and pixel data and further wherein said translator converts said pixel address into a corresponding address in said frame buffer memory device.

18. The frame buffer memory device controller of claim 16, wherein said allocator determines whether any changes are required to cache states of said frame buffer memory device.

19. The frame buffer memory device controller of claim 18, wherein said allocator determines whether any changes are required to caches states of a first level cache and a second level cache in said frame buffer memory device.

20. The frame buffer memory device controller of claim 19, wherein said scheduler buffers first level cache requests, second level cache requests and pixel access parameters in a first memory queue, a second memory queue and a third memory queue, respectively.

21. The frame buffer memory device controller of claim 20, wherein said memory queues operate independently such that a second level cache request is enabled to push ahead of a first level cache request.

22. The frame buffer memory device controller of claim 20, wherein said memory queues operate independently such that a first level cache request is enabled to push ahead of a pixel access parameter.

23. The frame buffer memory device controller of claim 20, wherein said arbiter arbitrates said first level cache requests, said second level cache requests and video access requests and issues said first level cache requests, said second level cache requests and said video access requests as dynamic random access memory requests on a dynamic random access memory bus.

\* \* \* \* \*